United States Patent [19]

Fädler

[11] Patent Number: 4,650,054

[45] Date of Patent: Mar. 17, 1987

[54] DISENGAGING DEVICE FOR A DOUBLE FRICTION CLUTCH

[75] Inventor: Kurt Fädler, Niederwerrn, Fed. Rep. of Germany

[73] Assignee: Fichtel & Sachs AG, Schweinfurt, Fed. Rep. of Germany

[21] Appl. No.: 826,499

[22] Filed: Feb. 5, 1986

[30] Foreign Application Priority Data

Feb. 7, 1985 [DE]  Fed. Rep. of Germany ....... 3504086

[51] Int. Cl.⁴ .............................................. F16D 23/14
[52] U.S. Cl. ............................. 192/85 CA; 192/87.11; 192/91 R; 192/101
[58] Field of Search ............. 192/85 C, 85 CA, 87.11, 192/87.13, 87.18, 87.19, 101, 110 B, 98, 91 R; 91/53, 152

[56] References Cited

U.S. PATENT DOCUMENTS 3,460,656  8/1969  Swanson ...................... 192/87.13 X

FOREIGN PATENT DOCUMENTS 898240 11/1953 Fed. Rep. of Germany ... 192/87.11
8422431 10/1984 Fed. Rep. of Germany .

Primary Examiner—George H. Krizmanich
Attorney, Agent, or Firm—Toren, McGeady and Goldberg

[57] ABSTRACT

The disengaging device for a double friction clutch, particularly the starting-up and gear shifting clutch as well as the power take-off clutch of an agricultural tractor vehicle comprises a housing in which, adapted to have hydraulic pressure applied to them, there are formed two coaxially interengaging annular cylindrical spaces. Axially displaceable independently of each other within the annular cylindrical spaces are annular pistons which carry mutually coaxial disengaging bearings. The housing preferably consists of three separate cylindrical tubes which carry radially outwardly projecting annular flanges at their ends which are axially remote from the disengaging bearings and are fixed to one another via these annular flanges. The disengaging device is compact both axially and also radially.

6 Claims, 2 Drawing Figures

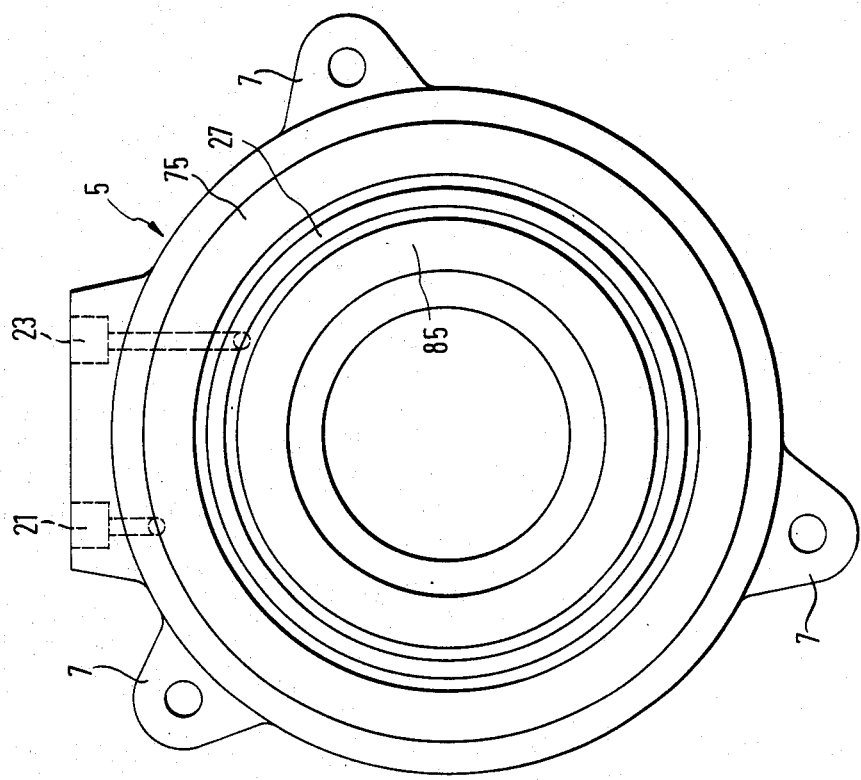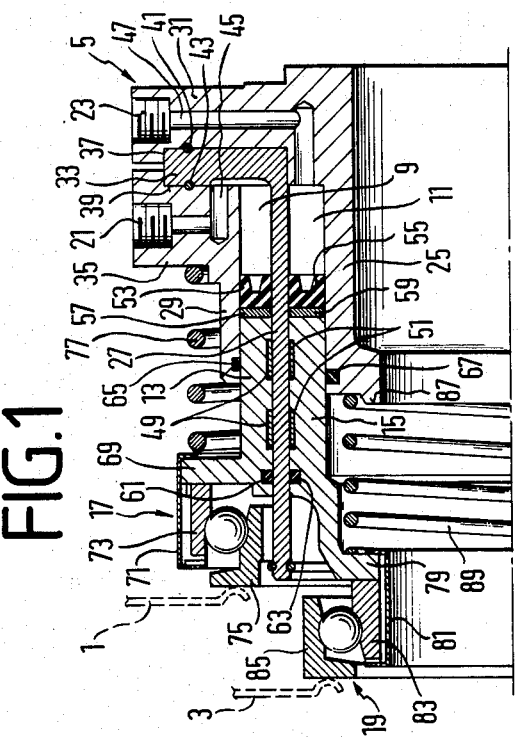

DISENGAGING DEVICE FOR A DOUBLE FRICTION CLUTCH

BACKGROUND OF THE INVENTION

The invention relates to a disengaging device for a double friction clutch having disengaging members coaxial with one another.

For example tractors or towing vehicles used in agriculture have in addition to a starting and gear shifting clutch a further clutch through which a power take-off shaft is driven in order to operate machinery or the like. Double clutches of this type consist of two conventional friction clutches, of which the disengaging members constituted for instance by the tongues of diaphragm springs, are located coaxially with the axis of rotation of the clutch. Associated with each of the two clutches is a separate disengaging system having a separate clutch pedal. The disengaging means of conventional double clutches comprise for each clutch a disengaging bearing which is actuated mechanically through a disengaging fork. The disengaging means in conventional double clutches occupy comparatively considerable space.

Known from German Utility Model No. 84 22 431 is a hydraulic disengager for a single clutch in which the disengaging bearing is fixed on an annular piston which is guided for axial displacement in an annular cylinder. When hydraulic pressure is applied to the annular cylinder, the clutch is disengaged.

The object of the invention is to provide a disengaging device for a double friction clutch but which occupies relatively little space.

SUMMARY OF THE INVENTION

The disengaging device according to the invention comprises, disposed coaxially within each other, two disengaging bearings each with a rotating bearing ring and a non-rotating bearing ring. Located in a substantially annularly cylindrical housing located alongside the disengaging bearings are two coaxially interengaged circularly cylindrical annular cylindrical spaces which are open towards the disengaging bearings. The annularly cylindrical spaces are separated from each other radially by a cylindrical separating wall and are closed on the side which is axially remote from the disengaging bearing. Guided for sealed axial displacement in each of the annular cylindrical spaces is an annular piston which carries a disengaging bearing at its end which protrudes from the annular cylinder. The annularly cylindrical spaces are adapted to have hydraulic pressure applied to them independently of each other in order to actuate the two clutches of the double clutch. In comparison with conventional mechanical disengaging devices of known double clutches, such a disengaging device is both compact in an axial direction as well as in a radial direction and is suitable for transmitting high disengaging forces.

The housing of the disengaging device consists preferably of three coaxially interengaged cylindrical tubes, each of which carries a radially projecting annular flange at its end which is remote from the disengaging bearings. The cylindrical tubes are combined to form a single unit via their annular flanges which bear on one another axially in sealing-tight fashion. Since the three cylindrical tubes can be produced separately from one another, the cost of manufacture is reduced in comparison with a housing which is manufactured in one piece.

The radial clearance of the annular pistons in the two annularly cylindrical spaces due to the manufacturing tolerances can be reduced if the middle cylindrical tube is used for guiding both annular pistons, for example in that the tolerances of the annular pistons in relation to the cylindrical faces of the middle cylindrical tube are by the use of slide rings fitted in the annular pistons, of smaller dimensions than the tolerances of the annular pistons in relation to the inner and outer cylindrical tube. The cylindrical faces of the middle cylindrical tube, since they are manufactured from a single workpiece, can without problem be machined to a high level of accuracy.

The middle cylindrical tube expediently protrudes in an axial direction beyond the outer and inner cylindrical tubes, so that it is possible to provide relatively long and thus non-tilting guides for both annular pistons.

The disengaging bearings are preferably guided for radial movement on radially projecting annular flanges of the annular pistons so that in operation they can be self-centring in relation to the disengaging means of the clutch. It is conducive to compact construction of the disengaging device for the annular flange of the outer annular piston to project radially outwardly while the annular flange of the inner annular piston projects radially inwardly. Likewise, any initial load springs which may be provided and which press the disengaging bearings against the disengaging members of the clutches, can be disposed on the one hand radially outside of and on the other radially inside of the annular pistons.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 shows an axial longitudinal section through the upper half of a hydraulic disengaging device for a double friction clutch, particularly of an agricultural towing vehicle, and FIG. 2 shows an axial plan view of the disengaging device.

DETAILED DESCRIPTION OF THE DRAWINGS

The drawings show a disengaging device for a double friotion clutch of an agricultural towing or tractor vehicle, of which one clutch is used as a starting-up and gear shifting clutch for the vehicle while the other clutch is used as a power take-off clutch. The clutches are of conventional construction and are mounted coaxially of each other on the crankshaft of the internal combustion engine of the vehicle. The friction discs of the two clutches are hereby connected rotationally rigidly to gearbox input shafts of which one is a hollow shaft and coaxially encloses the other shaft. FIG. 1 shows in broken lines only disengaging members 1 and 3, here in the form of spring tongues of the main clutch springs (constructed as diaphragm springs) of the two clutches. The disengaging device comprises a substantially annular housing 5 enclosing the gearbox input shafts, not shown in greater detail, the housing 5 being fixed by fixing lugs 7 by its end which is axially remote from the spring tongues 1 and 3 and on the gearbox of the vehicle, not shown in greater detail. The housing 5 contains two mutually coaxial circularly cylindrical annularly cylindrical spaces 9, 11 which are open towards the spring tongues 1, 3. Located for axial displacement independently of each other in the annularly cylindrical spaces 9, 11 are annular pistons 13, 15 which carry at their ends protruding from the annularly cylindrical spaces 9, 11 coaxially interengaged disengaging bearings 17, 19 through which the annular pistons 13, 14 bear on the spring tongues 1, 3. The annularly cylindrical spaces 9, 11 can have hydraulic pressure applied to them independently of each other through connections 21, 23 so that the clutches can be engaged and disengaged independently of each other. To generate the hydraulic pressure, there are on the vehicle transmitter cylinders which are operated by separate pedals but which are not shown in the drawings.

The housing 5 consists of three tubular cylinders 25, 27, 29 each of which has on its side axially remote from the bearings 17, 19 a radially outwardly projecting annular flange 31, 33 or 35. The annular flanges 31, 35 of the inner cylindrical tube 25 and of the outer cylindrical tube 29 enclose axially between them the annular flange 33 of the middle cylindrical tube 27 and are provided with annular recesses 37, 39 in which the annular flange 33 is radially centred in relation to the annular flanges 31, 35. Seals 41, 43 on the annular flange 33 seal the annularly cylindrical spaces 9, 11 in respect of one another. Fixing means, for example axial bolts, not shown in greater detail, fix the annular flanges 31, 33, 35 and thus the cylindrical tubes 25, 27, 29 rigidly to one another.

The annular flanges 31, 35 of the outer tubular cylinder 29 and of the inner tubular cylinder 25 are provided with connecting bores 45, 47 which connect the connections 21 and 23 to the annularly cylindrical spaces 29, 11.

The outer annular piston 13 carries on its inner casing and at an axial distance from one another two slide rings 49 which guide it radially on the outer shell of the middle cylindrical tube 27. The cylindrical faces of the cylindrical tube 27 which are used for guiding the annular cylinders 13, 15 can be manufactured with close tolerances since they are formed on a single piece. The tolerances of the annular piston 13 in relation to the outer cylindrical tube 29 and the annular piston 15 in relation to the inner cylindrical tube 25 can be kept correspondingly larger. For sealing of the annular pistons 13, 15 in relation to the cylindrical walls of the tubes 25, 27 and 29, annular lipped seals 53, 55 are used which are braced through sealing rings 57, 59 on those end faces of the annular pistons 13, 15 which are on the pressure side. The sealing rings 57, 59 act as scrapers which prevent dirt contaminating the lips of the seals 53, 55 so avoiding damage to the lips. The annular pistons 13, 15 carry, axially adjacent to the rolling-type bearings 17, 19 further scraper rings 61, 63 which bear on the central cylindrical tube 27. Additional scraper rings 65, 67 are provided in the region of those ends of the cylindrical tubes 25, 29 which are towards the roller bearings.

The outer annular piston 13 carries at its end which projects from the annular cYlindrical space 9 a radially outwardly projecting annular flange 69 on which is guided for radial movement a non-rotating outer bearing ring 73 of the bearing 17, secured by means of a fixing ring 71. The inner bearing ring 75 of the bearing 17 bears on the spring tongues 1 so that it is automatically centred in relation to the axis of rotation of the clutch. Clamped axially and resiliently between the annular flange 69 of the annular piston 13 and the annular flange 35 of the outer cylindrical tube 29 is a coil spring 77 which encloses the cylindrical tube 29 and the annular piston 13 in equiaxial fashion, so that independently of the application of hydraulic pressure to the annular cylindrical space 9, the rotating bearing ring 75 is maintained in self-centering contact with the spring tongues 1.

At its end which projects out of the annular cylindrical space 11, the annular piston 15 carries a radially inwardly projecting annular flange 79 on which an upright inner bearing ring 83 of the bearing 19 is guided ior radial movement by means of a fixing ring 81. The rotating outer bearing ring 85 of the bearing 19 bears in self-centring manner on the spring tongues 3. Clamped axially between the annular flange 79 and, pointing towards the annular flange 79, an annular shoulder 87 of the inner cylindrical tube 25 is a coil spring 89 which maintains the annular piston 15 and thus the rotating bearing ring 85 in constant self-centring contact with the spring tongues 3. The coil spring 89 is seated coaxially within the inner annular piston 15 which is, to accommodate the coil spring 89, axially longer than is the outer annular piston 13.

The middle cylindrical tube 27 projects axially beyond the cylindrical tubes 25, 29 so that even when the annular pistons 13, 15 are almost compeltely extended out of the annular cylindrical spaces 9, 11, they can still be guided in non-tilting fashion. When the annular pistons 13, 15 are fully retracted into the annular cylindrical spaces 9, 11, the bearings 17, 19 overlap the middle cylindrical tube 27. The outside diameter of the outer bearing ring 85 is therefore smaller than the inside diameter of the cylindrical tube 27. Correspondingly, the inside diameter of the inner bearing ring 75 is greater than the outside diameter of the cylindrical tube 27.

While specific embodiments of the invention have been shown and described in detail to illustrate the application of the inventive principles, it will be understood that the invention may be embodied otherwise without departing from such principles.

What I claim is:

1. A disengaging device for a double friction clutch having mutually coaxial disengaging members comprising (a) located coaxially within each other two disengaging bearings each with one rotating bearing ring and one non-rotating bearing ring, (b) disposed coaxially alongside the disengaging bearings a substantially annular housing with two coaxially interengaged circularly cylindrical spaces which are open towards the disengaging bearings and adapted to have hydraulic pressure applied to them separately, said spaces being separated radially from each other by a cylindrical separating wall and being closed on the side which is axially remote from the disengaging bearings, (c) an annular piston in each of the annularly cylindrical spaces which, sealed in the annular cylindrical space is guided for axial displacement independently of the annular piston of the other annularly cylindrical space, protruding from the annularly cylindrical space and carrying one of the disengaging bearings on its projecting end.

2. A disengaging device according to claim 1, wherein the housing has, forming the two annularly cylindrical spaces, three coaxially interengaging cylindrical tubes each of which has at its end which is axially remote from the disengaging bearings a radially projecting annular flange and wherein the annular flange of the middle cylindrical tube is maintained in sealing-tight fashion axially between the annular flanges of the inner and outer cylindrical tube.

3. A disengaging device according to claim 2, wherein both annular pistons are provided with sliding guide rings which areguided on the middle cylindrical tube.

4. A disengaging device according to claim 3, wherein the middle cylindrical tube protrudes axially beyond the outer and the inner cylindrical tubes.

5. A disengaging device according to claim 1, wherein the outer annular piston carries at its end which projects from the outer annular cylindrical space a radially outwardly projecting annular flange while the inner annular piston carries at itsend projecting from the inner annularly cylindrical space a radially inwardly projecting annular flange and wherein the non-rotating bearing rings of the disengaging bearings are guided for radial movement on the annular flanges of the annular pistons.

6. A disengaging device according to claim 5, wherein in an axial direction, the inner annular piston is longer than the outer annular piston and wherein between the annular flange of the outer annular piston and the annular flange of the outer cylndrical tube there is a first coil spring which encloses the outer annular piston while between the annular flange of the inner annular piston and the end face of the inner cylindrical tube which is adjacent the inner disengaging bearing there is clamped a second coil spring which is enclosed by the inner annular piston.

* * * * *